United States Patent
Wagner et al.

[11] Patent Number: 5,822,708
[45] Date of Patent: Oct. 13, 1998

[54] CONTROLLER FOR AN AUTOMATIC MOTOR VEHICLE TRANSMISSION

[75] Inventors: Thomas Wagner, Merseburg; Michael Ulm, Alteglofsheim; Friedrich Graf, Regensburg, all of Germany

[73] Assignee: Siemens Aktiengesellschaft, Munich, Germany

[21] Appl. No.: 758,389

[22] Filed: Nov. 27, 1997

[30] Foreign Application Priority Data

Nov. 29, 1995 [DE] Germany ............... 195 44 516.3

[51] Int. Cl.⁶ .................. B60K 41/06; F16H 59/38
[52] U.S. Cl. ................. 701/54; 701/57; 477/109
[58] Field of Search ................ 701/51, 54, 57, 701/65, 87, 84; 477/34, 107, 109, 110

[56] References Cited

U.S. PATENT DOCUMENTS

| | | | |
|---|---|---|---|
| 4,355,550 | 10/1982 | Will et al. | 74/872 |
| 4,360,092 | 11/1982 | Müller et al. | 192/12 C |
| 4,770,064 | 9/1988 | Kuerschner | 74/858 |
| 4,823,266 | 4/1989 | Baltusis et al. | 364/424.1 |
| 5,072,631 | 12/1991 | Fujimoto et al. | 74/860 |
| 5,119,696 | 6/1992 | Yamaguchi | 74/866 |
| 5,261,296 | 11/1993 | Ramm | 74/856 |
| 5,307,270 | 4/1994 | Graf | 364/424.1 |
| 5,335,568 | 8/1994 | Kammerl et al. | 477/109 |
| 5,491,775 | 2/1996 | Madau et al. | 315/3 |
| 5,559,694 | 9/1996 | Kraemer et al. | 364/424.1 |
| 5,580,331 | 12/1996 | Shiraishi et al. | 477/109 |

FOREIGN PATENT DOCUMENTS 42 10 416 A1  12/1992  Germany .

*Primary Examiner*—Michael Zanelli
*Attorney, Agent, or Firm*—Herbert L. Lerner; Laurence A. Greenberg

[57] ABSTRACT

A control device for an automatic motor vehicle transmission reduces engine torque during a shifting operation, in particular a shifting operation in a traction mode, in order to increase smoothness of shifting. The engine torque reduction is begun at the earliest upon reaching a free-wheel point of the transmission and is ended shortly before a synchronizing point of the transmission is reached. The free-wheel point and the synchronizing point of the transmission are ascertained from rpm differences in the gearshift elements involved in the particular switching operation. Differential rpm thresholds used in the process and the intensity of the torque reduction are ascertained with fuzzy systems.

6 Claims, 7 Drawing Sheets

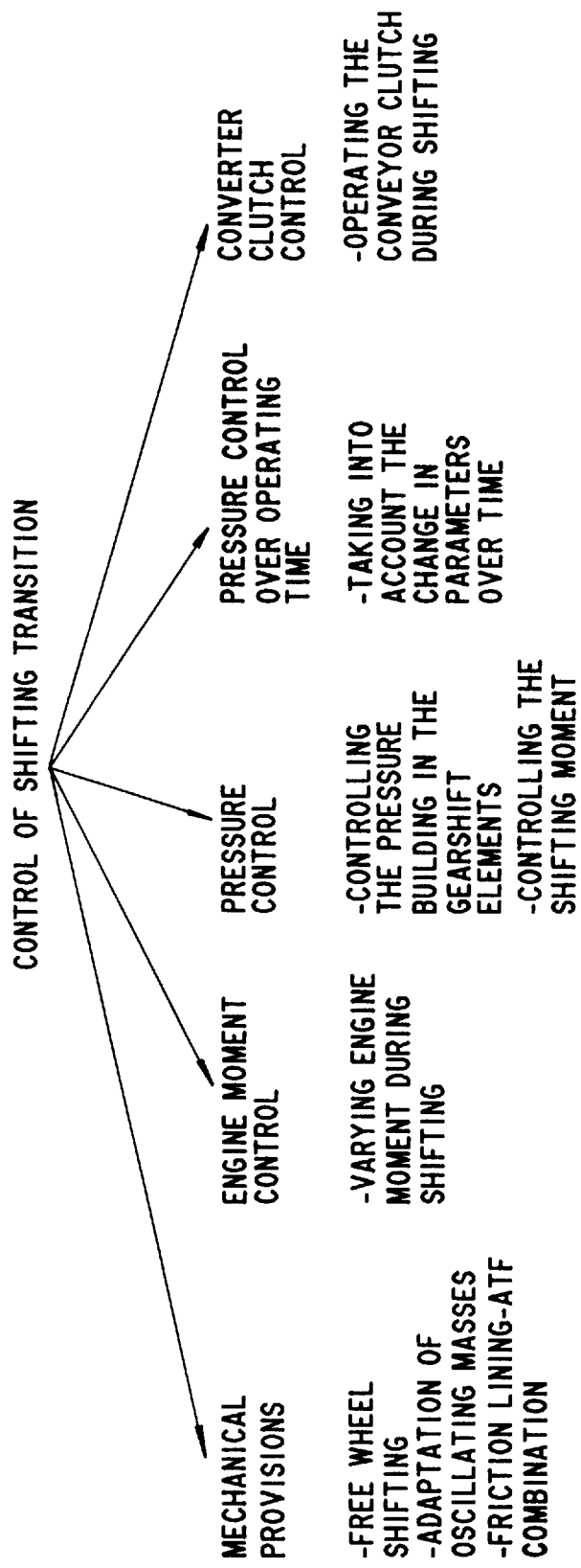

CONTROLLER FOR AN AUTOMATIC MOTOR VEHICLE TRANSMISSION

BACKGROUND OF THE INVENTION

1. Field of the Invention

The invention relates to a control device for an automatic motor vehicle transmission, by which engine torque is reduced in order to increase smoothness of shifting during a shifting operation, in particular a shifting operation in a traction mode.

Such a controller is used for shifting an automatic motor vehicle transmission. During shifting the engine torque is reduced to enable comfortable or in other words nonjerking shifting and to keep the power loss in the friction elements of the transmission as slight as possible. That kind of controller is appropriate for upshifting and downshifting. In downshifting in particular, an increase in comfort is sought, because in that case there are no power losses, due to the interruption of traction.

A known transmission controller sends an engagement signal to the engine controller when an automatic transmission is shifted. The engine controller thereupon changes the engine torque and thus enables nonjerking, low-wear shifting.

The transmission controller ascertains the proportion by which the engine torque should be varied and informs the engine controller of that proportion as control information (European Patent 0 518 855 B1, corresponding to U.S. Pat. No. 5,307,270).

In a known method for electronic control of an automatic vehicle transmission with electrohydraulically actuatable friction elements for shifting over among the various gear ratio stages, an actual variable that characterizes the shifting event is compared with a memorized desired variable, and if there is a deviation a correction value is ascertained, which adaptively varies the hydraulic pressure for the friction elements of the transmission (European Patent 0 176 750 B1). Among other factors, the gradient of the transmission input rpm during shifting of the friction elements is used as the variable that characterizes the shifting event. In order to detect the free-wheel point, the chronological derivation of the transmission input rpm may also be monitored. In order to detect the synchronization point, the synchronizing rpm can be determined from the transmission input rpm at the free-wheel point and from the gear step, with the prerequisite being a constant output rpm.

SUMMARY OF THE INVENTION

It is accordingly an object of the invention to provide a controller for an automatic motor vehicle transmission, which overcomes the hereinafore-mentioned disadvantages of the heretofore-known devices of this general type and which ascertains free-wheel and synchronization points of the transmission from rpms in the transmission that are simple to determine.

With the foregoing and other objects in view there is provided, in accordance with the invention, a control device for an automatic motor vehicle transmission, for reducing engine torque to increase smoothness of shifting during a shifting operation, in particular a shifting operation in a traction mode, comprising beginning the engine torque reduction at the earliest upon attainment of a free-wheel point of the transmission and ending the engine torque reduction shortly before a synchronizing point of the transmission is reached; and ascertaining the free-wheel point and the synchronizing point of the transmission on the basis of rpm differences between gearshift elements involved in a given shifting operation.

In accordance with another feature of the invention, the rpm differences of transmission gearshift elements, each including two gearshift element halves, are ascertained from a transmission input rpm, an output rpm and rpm factors resulting from gear tooth ratios in the transmission.

In accordance with a further feature of the invention, the engine torque is reduced as soon as the rpm difference of a given engaging gearshift element is not equal to zero.

In accordance with an added feature of the invention, the engine torque is returned to its outset value as soon as the rpm difference of the given gearshift element to be shifted exceeds a predetermined threshold rpm.

In accordance with a concomitant feature of the invention, there is provided a fuzzy system defining the threshold rpm, the fuzzy system evaluating a predetermined intensity of the engine torque reduction, a standardized engine torque at the beginning of shifting, and a standardized differential rpm at the engaging gearshift element, as input variables.

Other features which are considered as characteristic for the invention are set forth in the appended claims.

Although the invention is illustrated and described herein as embodied in a controller for an automatic motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 15 is a diagram showing a control of a shifting transition.

DESCRIPTION OF THE PREFERRED EMBODIMENTS

Figure 1:
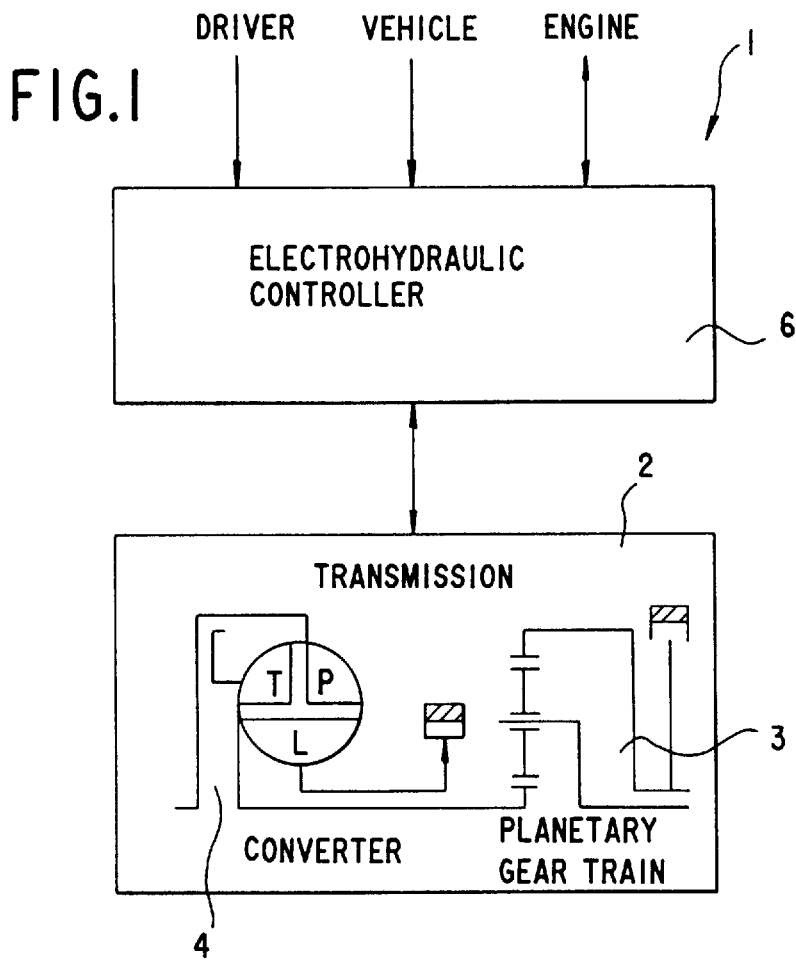
FIG. 1 is a schematic and block diagram showing a layout of an automatic transmission according to the invention.

Referring now to the figures of the drawings in detail and first, particularly, to FIG. 1 thereof, there is seen a drive 1 of a motor vehicle that includes a transmission 2 which has a planet wheel set 3 that is constructed, for instance, as a Ravigneaux, Simpson or Wilson type of construction, for rpm and torque conversion. A hydrodynamic torque converter 4, which is also known as a Fottinger converter, is used as a startup element that can be bypassed with a non-illustrated mechanical clutch to improve efficiency. The transmission is controlled by an electrohydraulic controller 6, which receives commands and data from the driver and the motor vehicle and exchanges data with the engine as is indicated in the drawing. The controller 6 includes an electronic control unit and a hydraulic actuation part, controlled by the electronic control unit, which supplies pressure fluid to actuators for various friction elements in the transmission, that is clutches, brakes and free wheels.

Figure 2:
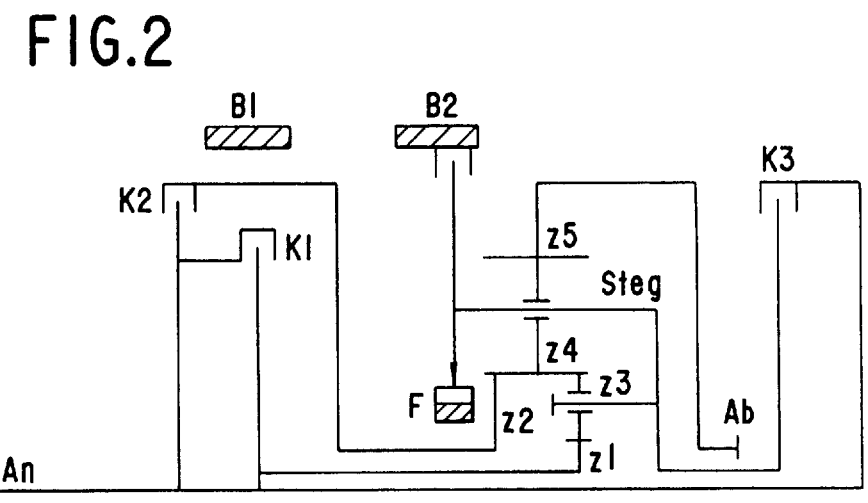
FIG. 2 is a schematic diagram showing components of the transmission of FIG. 1 that are essential to computer ascertainment of transmission data.

The automatic transmission 2 in the example described herein is constructed as a converter-type, four-speed transmission. Its basic layout can be seen from FIG. 2, in which a planetary gear on the Ravigneaux principle and a plurality of clutches and brakes are shown to realize the gear shifting operations, but not to realize the generally known hydrodynamic converters 4. The components of the transmission are as follows: an input or drive shaft An, an output or power takeoff shaft Ab, a first clutch K1, a second clutch K2, a first brake B1, a second brake B2 and a free wheel F. The gear wheels of the transmission are identified by their numbers of teeth listed as follows: z1=26 for a small sun wheel, z2=34 for a large sun wheel, z3=22 for a short planet wheel, z4=20 for a long planet wheel and z5=74 for a hollow wheel.

A fast gear (overdrive) is realized by connecting a transmission input with a support member of the first gear (strut) through an additional clutch. The support member both in fourth gear and second gear is the large sun wheel. Through the use of this kind of construction, it is possible to dispense with one additional groove to achieve the overdrive gear.

The two primary tasks of an electronic transmission controller are controlling the shifting point and controlling the shift transition. Shifting point control is carried out in a known manner through performance graphs (where a memorized throttle valve position is plotted over the output rpm). The choice of performance graphs stored in the control unit (such as "sporty", "economy" and "winter") is carried out manually or adaptively by the evaluation of variables measured while the vehicle is in operation.

By far the more-complex part of the electronic transmission controller is the control of the shifting transition. With its aid, the "softest" possible gear change is sought. In order to accomplish this, not only must the pressure in the friction elements involved in the shifting be varied, but many other activities, shown in the table below, are necessary. A shifting transition that meets modern demands for an automatic transmission can be attained only by using so-called smart control electronics. In terms of circuitry (hardware) this requires a large scale of component integration and high performance on the part of the microcontrollers being used, since a large number of data must be processed in a very short time.

The two essential aspects of control are the control of engine torque (also called engine moment control) and pressure control, as shown in FIG. 15. In engine moment control, intervention into the engine controller is made during shifting. To that end, data are exchanged between the transmission controller and the engine controller. The shifting and release of the gearshift elements in the transmission are controlled with the aid of the pressure control. To that end, a pressure modulation is performed with proportional or fast-switching valves. Both aspects are closely related and affect one another. The pressure control in shifting operations is described in co-pending U.S. patent application Ser. No. 08/758,385, filed on the same day as the instant application.

In the context of the present invention, a fuzzy-logic-based shifting transition controller was developed and tested with a "closed-loop" simulation. The main emphasis was traction shifting. The transmission 2 is constructed as a four-speed Ravigneaux set with a Fottinger converter.

Essentially, the following steps were carried out:
preparation of a simulated model for a four-speed Ravigneaux transmission within a simple drive train;
construction of a model for the hydraulic controller;
construction of a fuzzy-logic-based engine moment controller;
construction of a fuzzy-logic-based pressure controller;
testing of the shifting transition control in the simulation.

The use of fuzzy systems for controlling the automatic transmission 2 was chosen because of the complexity of the stated object and the many variables to be processed. Moreover, such a system can be prepared relatively quickly with available development systems (tools).

The control of the engine moment when shifting in the traction mode will be described below. It is also possible in principle to vary the course of shifting for overrunning shifting through the use of an engine intervention. In order to vary the engine moment, the following options are available: adjusting ignition angle, fadeout of injections, electronic adjustment of the throttle valve and electronic adjustment of the idling charge. Since the electronic adjustment of the throttle valve and idling charge is relatively complicated to realize and involves inertia, and because it is unfavorable to vary the exhaust gas behavior by fading out injections, the ignition angle adjustment is used in this case.

Figure 3:
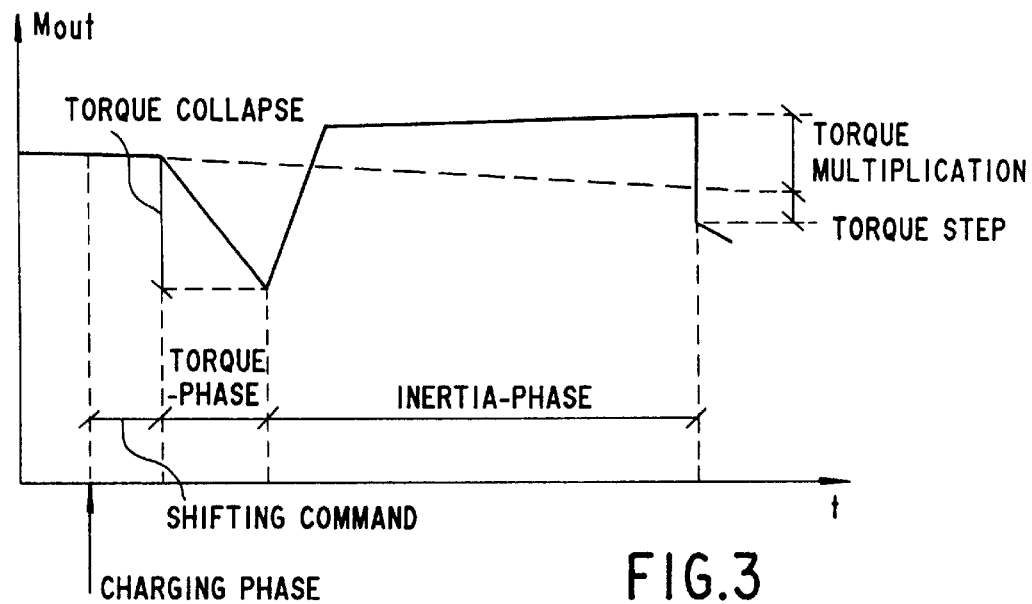
FIG. 3 is a graph showing a course over time of an output moment of a transmission in the case of traction shifting.

The control of the engine moment in traction shifting operations is described below. Traction shifting operations are the most critical shifting operations in terms of the power loss occurring in the gearshift elements and the resultant thermal strain on the friction linings. If the engine moment is not reduced during shifting, destruction of the friction linings occurs very easily. With an engine moment controller according to the invention, the excessive multiplication in output torque $M_{out}$, shown in FIG. 3, in the inertia phase of shifting a conventional transmission can be reduced, so that the transmission output moment is smoothed and there is a marked improvement in passenger comfort.

Equation 1 below shows that it is possible to reduce the lost work that occurs in the engaging gearshift element (free-wheel shifting), by reducing the engine moment.

$$Q_v = J_{in} \frac{\omega_{out}^2}{2} \cdot (i_{old} - i_{new})^2 + M_{Eng} \cdot t_s \cdot \frac{\omega_{out}}{2} \cdot (i_{old} - i_{new}) \tag{1}$$

The symbols in the equation are as follows:

| | |
|---|---|
| $Q_v$ | lost work |
| $t_s$ | shift time |
| $i_{new}$ | gear ratio of the new gear |
| $i_{old}$ | gear ratio of the old gear |
| $J_{in}$ | moment of inertia on input side of transmission |
| $M_{eng}$ | engine moment |
| $n_{out}$ | transmission output rpm |
| $\omega_{out}$ | output angle speed |

From this equation it can be seen that the lost work converted in the clutch is composed of a kinetic portion (braking of the engine masses) and a portion arising from the combustion in the engine. The possibility exists, by reducing the engine moment, of decreasing the lost work in the gearshift elements that occurs during shifting. It also becomes clear that upon a reduction in engine moment, the slip time of the gearshift element can be increased, without increasing the lost work. This increase in available slip time improves the smoothness of shifting.

In evaluating the possibilities created by the engine moment intervention, the product of the engine moment and the shifting time is decisive. The shifting time is considered to be a function of the clutch moment, since that can be varied from outside. If the engine moment is not varied, then to achieve a slip time that is not critical to the magnitude of the lost work, a high clutch moment must be brought to bear. If the clutch moment remains constant and the engine moment is reduced, then the slip time becomes shorter and thus there is less lost work. Conversely, if the slip time is to remain constant despite a reduction in the engine moment, then the clutch moment can be reduced accordingly. What is important is to optimize the length of the slip time with respect to shifting smoothness and strain on the friction elements.

The sequence control of the engine intervention in traction shifting operations will now be described. The main problem in sequence control is the precise adaptation of the timing of the engine intervention. It is crucial that the engine moment not occur before the gearshift element that carries the old gear is released completely (free-wheel point). Up to that time, the gear ratio of the old gear is retained unchanged, and a reduction in engine torque would lead to an increased sag in torque in the torque phase. Accordingly, it is necessary that the free-wheel point be detected exactly. When the free-wheel point is reached, the engine torque can immediately be reduced to a predetermined value.

The instant for ending the engine intervention must be chosen in such a way that the restoration of the engine torque to its initial value occurs as shortly as possible before the synchronizing point (end of shifting) and the regulation upward until the end of shifting is chronologically feasible. Proposals thus far take their point of departure, as noted, for instance in monitoring the chronological derivation of the transmission input rpm to detect the free-wheel point. In order to detect the synchronizing point, the synchronizing rpm can be determined from the transmission input rpm at the free-wheel point, and the gear step, on the condition that the output rpm is constant. Shortly before the synchronizing rpm is reached, the torque is scaled back to its original value.

In the context of the present invention, the free-wheel point and the synchronizing point are determined from the differential rpm values involved in the shifting. These rpm values of the gearshift element halves may be determined from the transmission input rpm, the output rpm and the rpm factors. If the transmission input rpm is not available, then calculation can also be carried out with rpm of an internal shaft in the transmission, since the input rpm $\omega_{in}$, output rpm $\omega_{out}$ and coupling shaft rpm $\omega_i$ are always linked through the following equation 2:

$$\omega_i = a_i \cdot \omega_{in} + b_i \cdot \omega_{out}. \qquad (2)$$

The rpm factors $a_i$ and $b_i$ are ratios of numbers of teeth and characterize the angular speeds of the corresponding coupling shafts as a function of the angular speeds of the drive and output. The drive and output are each considered to be fixed for calculation purposes. The relationship that applies is $$a_1 + b_1 = 1.$$

The rpm factors of the gearshift element halves must be calculated for the corresponding transmissions, and must be available, given an association with the type of shifting (1–2, 2–3, ...) in a memory, which is represented by the following table.

| Shifting type | rpm factors of the disengaging clutch | | rpm factors of the shifting clutch | |
|---|---|---|---|---|
| 1-2 | $a_{111}, b_{111}$ | $a_{121}, b_{121}$ | $a_{s11}, b_{s11}$ | $a_{s21}, b_{s21}$ |
| 2-3 | $a_{112}, b_{112}$ | $a_{122}, b_{122}$ | $a_{s12}, b_{s12}$ | $a_{s22}, b_{s22}$ |
| 3-4 | $a_{113}, b_{113}$ | $a_{123}, b_{123}$ | $a_{s13}, b_{s13}$ | $a_{s23}, b_{s23}$ |

In the table:

a is the rpm factor referred to the drive b is the rpm factor referred to the output l is the disengaging gearshift element s is the engaging gearshift element The 1st digit stands for the gearshift element half The 2nd digit stands for the shifting type The rpms of the gearshift element halves involved in the shifting can thus be determined. The differential rpm values of the halves of the gearshift elements can then be calculated in turn from these individual rpm values, using the following equations 3 and 4:

disengaging clutch: (for example: shifting 1–2)

$$n_{111} = a_{111} \cdot n_{in} + b_{111} \cdot n_{out}$$

$$n_{121} = a_{121} \cdot n_{in} + b_{121} \cdot n_{out}$$

$$abs(ndiff_{11}) = abs(n_{111} - n_{121}) \qquad (3)$$

where:

$n_{111}$ is the rpm of the first half of the disengaging gearshift element for the shifting transition 1–2

$n_{121}$ is the rpm of the second half of the disengaging gearshift element for the shifting transition 1–2

$ndiff_{11}$ is the differential rpm of the disengaging gearshift element for the shifting transition 1–2 engaging clutch: (for example: shifting 1–2)

$$n_{s11} = a_{s11} \cdot n_{in} + b_{s11} \cdot n_{out}$$

$$n_{s21} = a_{s21} \cdot n_{in} + b_{s21} \cdot n_{out}$$

$$abs(ndiff_{s1}) = abs(n_{s11} - n_{s21}) \qquad (4)$$

where:

$n_{s11}$ is the rpm of the first half of the engaging gearshift element for the shifting transition 1–2

$n_{s21}$ is the rpm of the second half of the engaging gearshift element for the shifting transition 1–2

$ndiff_{s1}$ is the differential rpm of the engaging gearshift element for the shifting transition 1–2

Figure 4:
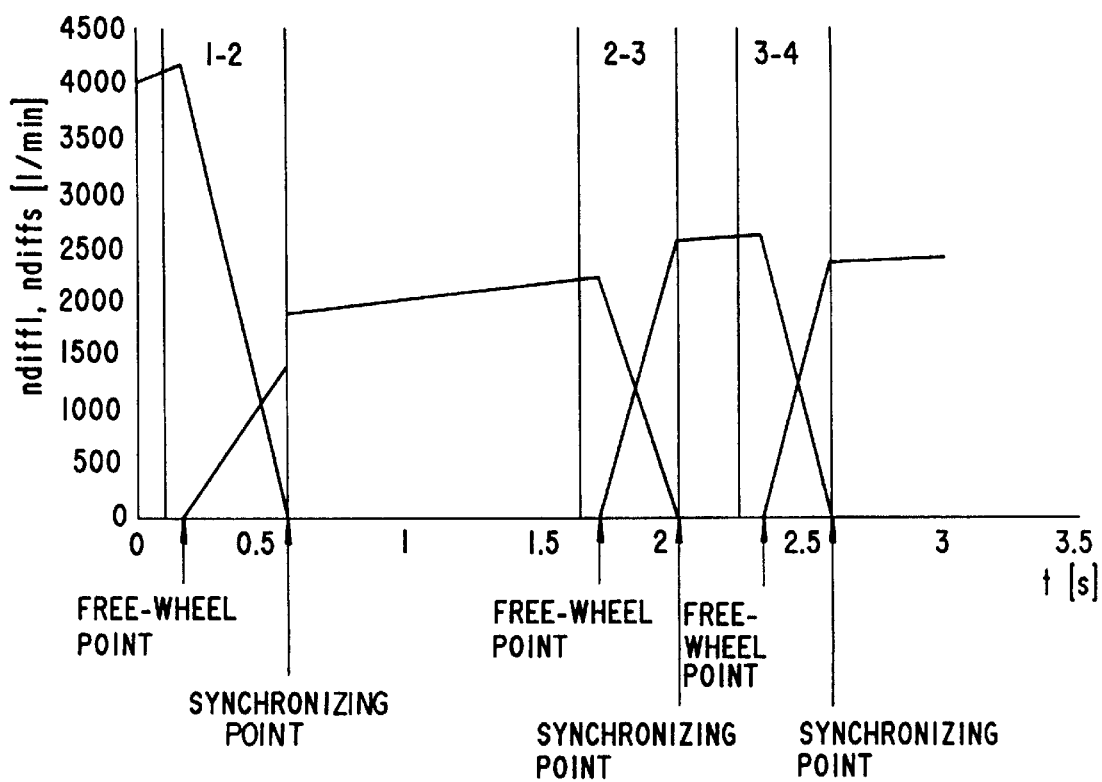
FIG. 4 is a graph showing courses of a differential rpm of one gearshift element to be shifted and one gearshift element to be disengaged in the transmission of FIG. 2.

Thus for the current shifting operation the differential rpm values at the two gearshift element values are available. The free-wheel point (differential rpm of the disengaging gearshift element becomes greater than zero) and the synchronizing point (differential rpm of the engaging gearshift element becomes zero) can then be determined exactly with the absolute values of these differential rpm values. The courses of the differential rpm values of the shifting and the disengaging gearshift element can be seen from FIG. 4.

As already suggested earlier herein, upon detection of the "free-wheel point", the engine torque can be reduced immediately. This reduction must be terminated shortly before the synchronizing point, so that enough time will still remain for the scaling back. In order to accomplish this, a threshold rpm difference is ascertained, so that if this threshold fails to be attained by the rpm difference of the shifting clutch, the engine intervention is terminated. The reducing engine torque is then returned to its initial value again.

Figure 5:
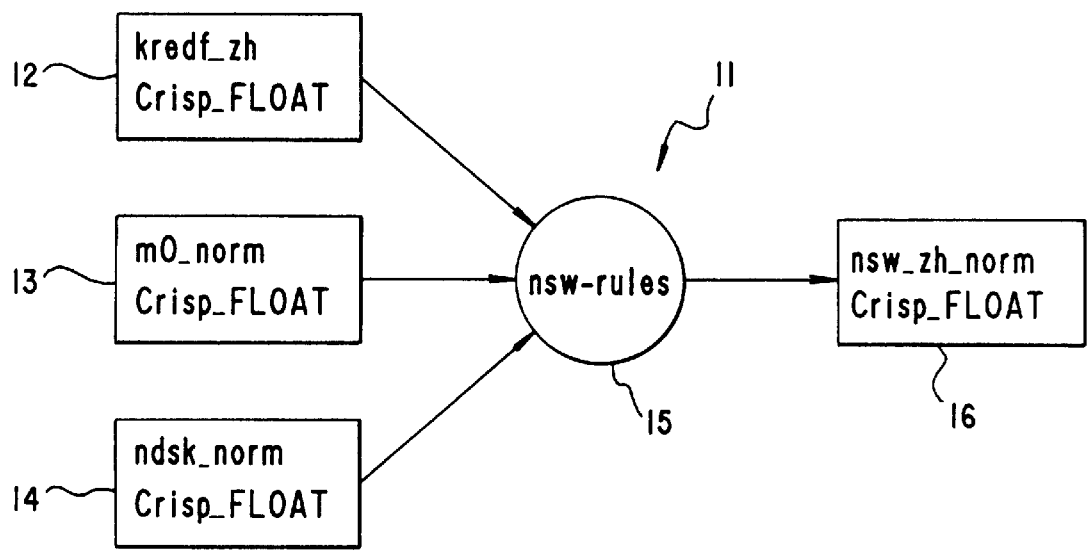
FIG. 5 is a block diagram of a fuzzy system used in the controller of the transmission of FIG. 1 or 2.

The defining of the threshold rpm is carried out through the use of a fuzzy algorithm, which proceeds in a fuzzy system 11 (FIG. 5). This algorithm is called up at the beginning of the shifting operation and includes the following input variables 12–14, which are processed in a rule base 15:

12=intensity of torque reduction (factor 0 . . . 1);
13=standardized engine torque at onset of shifting:

$$M_{Eng_{norm}} = \frac{M_{Eng}}{M_{Eng_{max}}} \quad (5)$$

14=standardized differential rpm at the gearshift element to be shifted:

$$ndiff_{s_{norm}} = \frac{ndiff_s}{ndiff_{s_{norm}}} \quad (6)$$

During the traction shifting operation, the engine torque does not vary substantially, because of the precautions taken. It is therefore possible to estimate the step in torque necessary for the resetting, from the engine torque at the onset of shifting and the magnitude of torque reduction. There must be enough time available to complete this torque step, for instance through the use of an ignition angle adjustment.

The value of the differential rpm at the onset of shifting, given relatively constant shifting times, allows a conclusion to be drawn as to the magnitude of the negative rise in the course of the differential rpm. If the rise is strongly negative, the differential rpm threshold must be raised, because otherwise the time remaining until the end of shifting is too short for the torque resetting.

An output variable 16 of the fuzzy algorithm is a standardized threshold rpm $nsw_{norm}$, with standardization being performed to a differential rpm of 130*1/min.

The structure of the fuzzy algorithm can be seen from FIG. 5. In it the following variables are used:

kredf_zh: intensity of torque reduction for traction upshifting,
m0_norm: standardized engine torque,
ndsk_norm: standardized differential rpm of the engaging gearshift element,
nsw_zh_norm: standardized rpm threshold.

Figure 6:
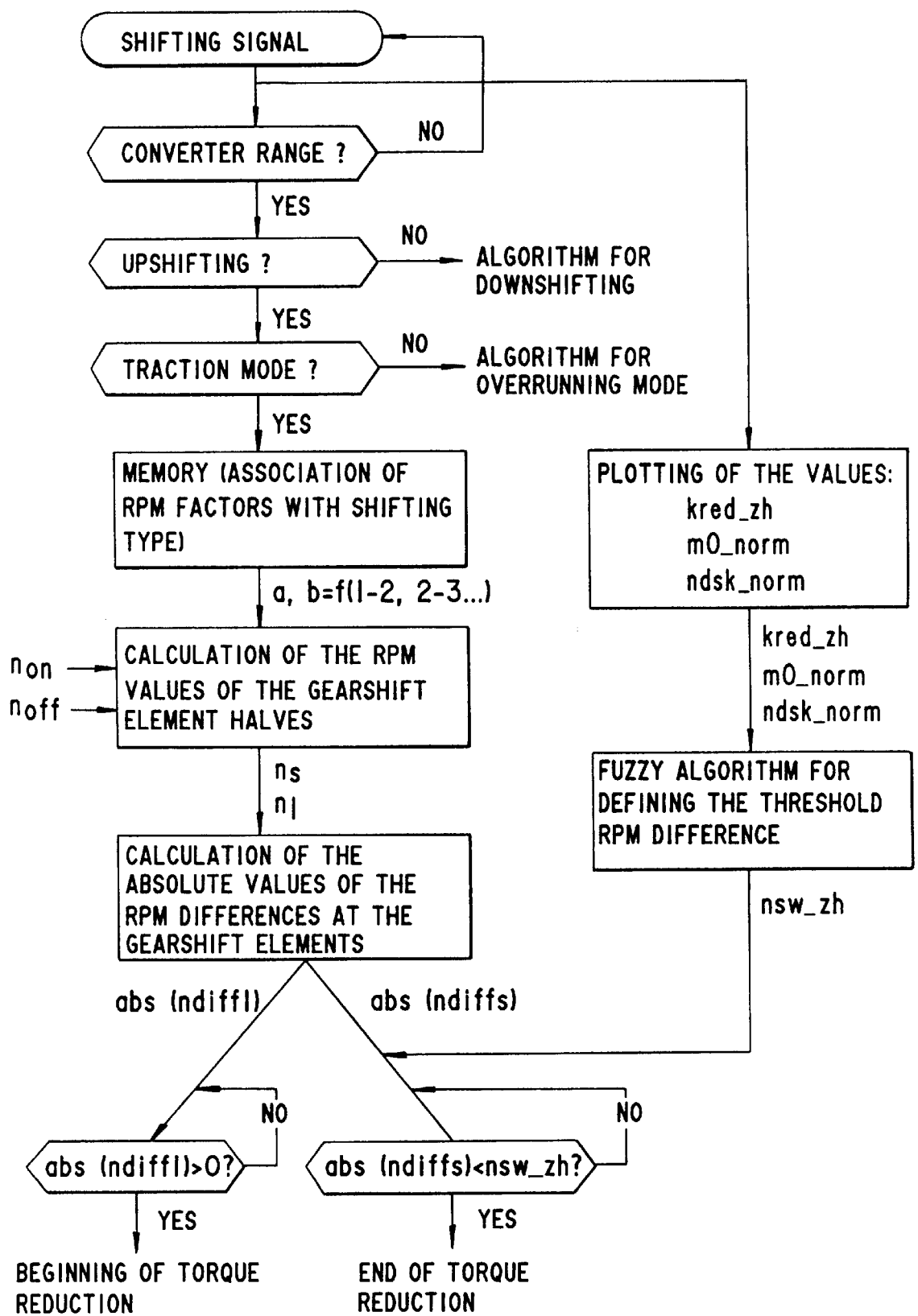
FIG. 6 is a flow chart of a program for detecting an onset and an end of a moment reduction.

In FIG. 6, the entire algorithm for detecting the beginning and end of torque reduction for traction upshifting is shown in the form of a flow chart.

The flowchart is self-explanatory. It can be seen that in the converter range, no variation of torque is performed, so that the shifting proceeds at very low torques. The detection of the converter range is carried out by monitoring the course of the converter amplification $\mu$.

The intensity of torque reduction in traction shifting operations will now be explained. As already indicated earlier above, the goal of torque reduction in traction upshifting is to improve shifting smoothness and reduce the lost work occurring during the shifting transition. The improvement in shifting smoothness is attained because the requisite clutch moment for shifting can be reduced by reducing the torque. This averts a strong multiplication of the output torque in the inertia phase. The possibility of reducing the lost work has been shown with respect to equation 5.14.

The system explained herein for varying the torque parametrizes the intensity of torque reduction at the onset of traction upshifting. This requires that through the use of conclusive variables at the onset of shifting, a conclusion can be drawn about the lost work to be expected, and defining the intensity of torque reduction accordingly. This is carried out with the aid of two input variables: gear step and transmission input rpm. The choice of these two variables is based on the fact that the lost work is determined essentially by the shifting time, which in turn is determined by the gear step and the transmission input rpm (equation 5.9). An increase in the two variables brings about an increase in lost work. If the shifting time is kept fairly constant through the use of the pressure control, then upon a torque reduction the requisite clutch moment can be reduced, which leads to an improvement in shifting smoothness.

In order to parametrize the intensity of torque variation, a fuzzy system 18 (FIG. 7) is used, which generates the intensity of the torque reduction as an output value 22 (FIG. 7) from the input variables of gear step 19 and transmission input rpm 20 in a rule base 21. This output value serves as a reducing factor for the further processing within the transmission controller. The term parametrizing is understood in this case to mean the precise ascertainment of a variable, using known or derivable transmission parameters.

The use of the fuzzy system is especially advantageous because there is practically no resultant need for a sharp distinction between the "transmission input rpm" input variable and the "reducing factor" output variable.

Figure 7:
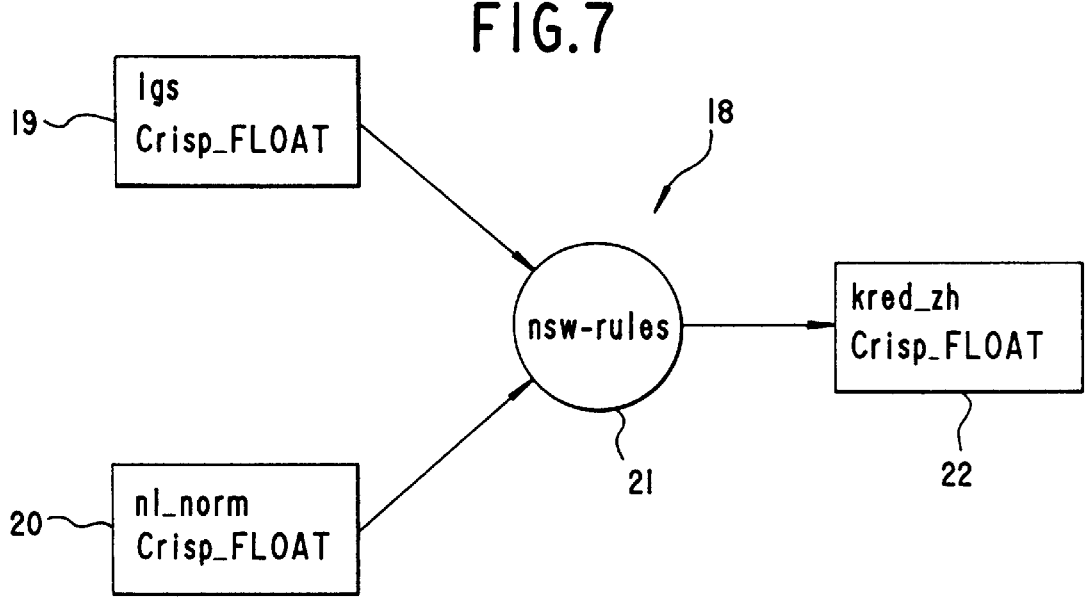
FIG. 7 is a block diagram of a fuzzy system for parametrizing the moment reduction.

The variables in FIG. 7 have the following meanings:
igs_fuzzy: gear step,
n1_fuzzy: standardized transmission input rpm,
kred_zh: factor of torque reduction for traction upshifting [0 . . . 1],
nsw-rules: rules of rule base 21.

The transmission input rpm has thus been standardized to its maximum value.

Figure 8:
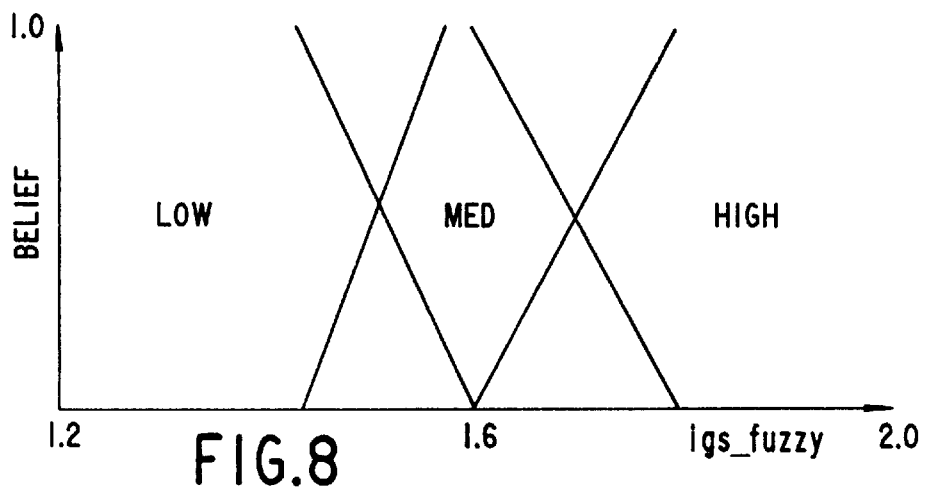
FIGS. 8–10 are graphs of membership functions of input and output variables of the fuzzy system of FIG. 7.
Figure 9:
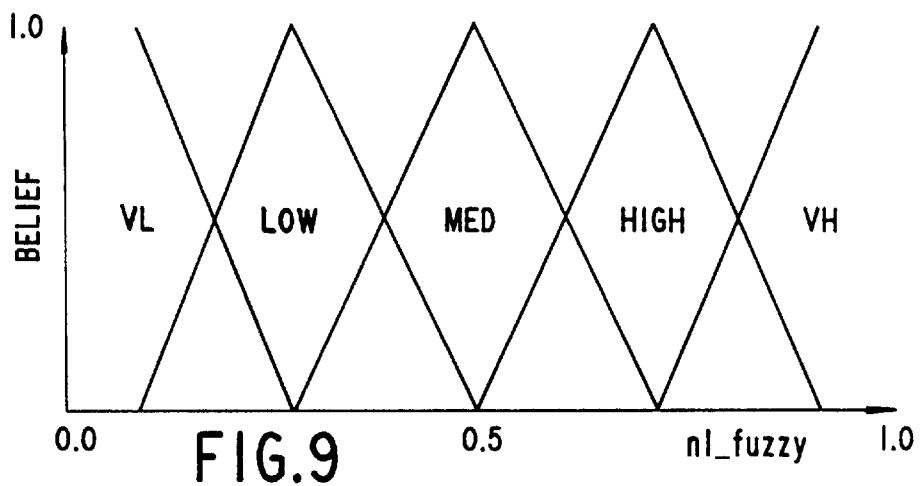
Figure 10:
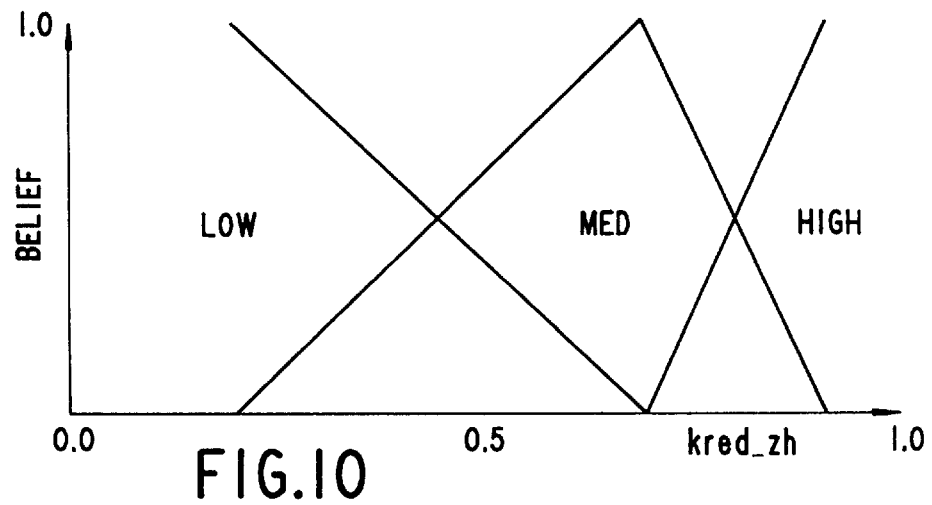

The fuzzy sets of input and output variables of the fuzzy system 18 can be seen from FIGS. 8, 9 and 10. They show the membership functions of the three fuzzy variables, that is the degrees of membership of the variables igs, n1_fuzzy, and kred_zh.

Figure 11:
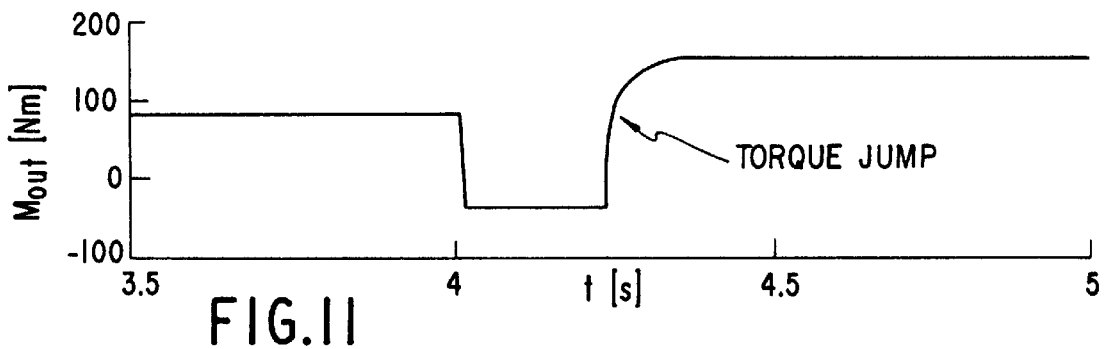
FIGS. 11 and 12 are graphs showing a course of the output torque and the engine torque in traction downshifting without moment reduction.
Figure 12:
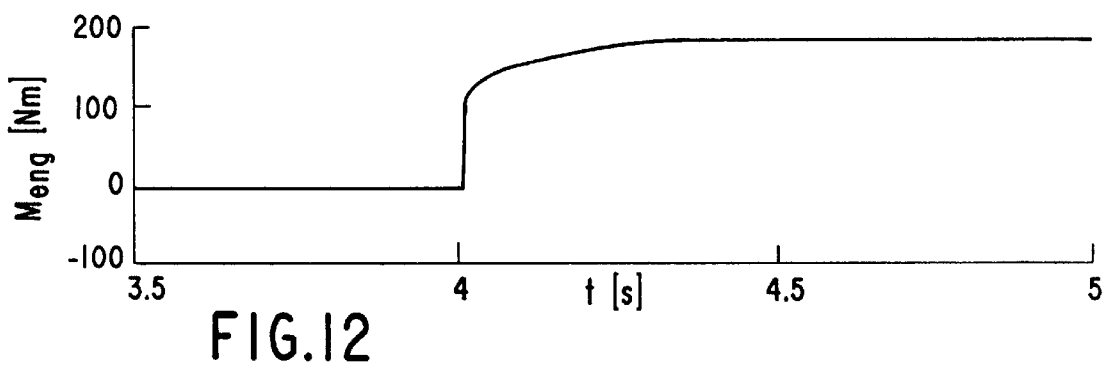

The rule base 21 includes the following fuzzy rules:
RULEBASE mehs_rules
RULE Rule1
IF(igs_fuzzy IS LOW)AND(n1_fuzzy IS VL)THEN
   kred_zh=HIGH END
RULE Rule2
IF(igs_fuzzy IS LOW)AND(n1_fuzzy IS LOW)THEN
   kred_zh=HIGH END
RULE Rule3
IF(igs_fuzzy IS LOW)AND(n1_fuzzy IS MED)THEN
   kred_zh=HIGH END
RULE Rule4
IF (igs_fuzzy IS LOW)AND(n1_fuzzy IS HIGH)THEN
   kred_zh=MED END
RULE Rule5
IF(igs_fuzzy IS LOW)AND(n1_fuzzy IS VH)THEN
   kred_zh=MED END RULE Rule6
IF(igs_fuzzy IS MED)AND(n1_fuzzy IS VL)THEN kred_zh HIGH END
RULE Rule7
IF(igs_fuzzy IS MED)AND(n1_fuzzy IS LOW)THEN kred_zh=HIGH END
RULE Rule8
IF(igs_fuzzy IS MED)AND(n1_fuzzy IS MED)THEN kred_zh=MED END
RULE Rule9
IF(igs_fuzzy IS MED)AND(n1_fuzzy IS HIGH)THEN kred_zh=MED END
RULE Rule10
IF(igs_fuzzy IS MED)AND(n1_fuzzy IS VH)THEN kred_zh=LOW END
RULE Rule11
IF(igs_fuzzy IS HIGH)AND(n1_fuzzy IS VL)THEN kred_zh MED END
RULE Rule12
IF(igs_fuzzy IS HIGH)AND(n1_fuzzy IS LOW)THEN kred_zh=MED END
RULE Rule13
IF(igs_fuzzy IS HIGH)AND(n1_fuzzy IS MED)THEN kred_zh=MED END
RULE Rule14
IF(igs_fuzzy IS HIGH)AND(n1_fuzzy IS HIGH)THEN kred_zh LOW END
RULE Rule15
IF(igs_fuzzy IS HIGH)AND(n1_fuzzy IS VH)THEN kred_zh=LOW END
END
END The results of torque reduction in traction downshifting operations will now be explained in conjunction with FIGS. 11–14. FIGS. 11 and 12 show the course over time of the output torque $M_{out}$ or engine torque $M_{eng}$ in traction downshifting without torque reduction. The sharp step in output torque (marked with an arrow) when the free-wheel catches can be clearly seen. The torque intervention seeks to reduce this step in torque that is associated with an acceleration jerk and a rotation of the output shaft.

Figure 13:
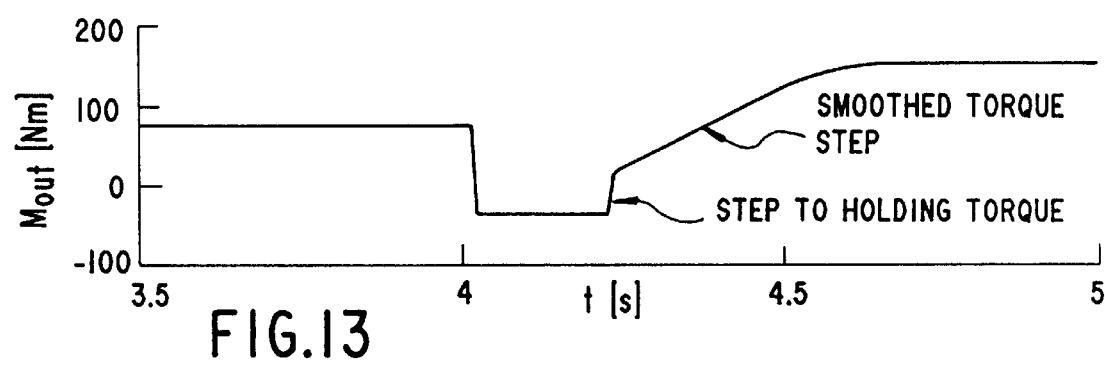
FIGS. 13 and 14 are graphs showing a course of the output torque and the engine torque in traction downshifting with moment reduction.
Figure 14:
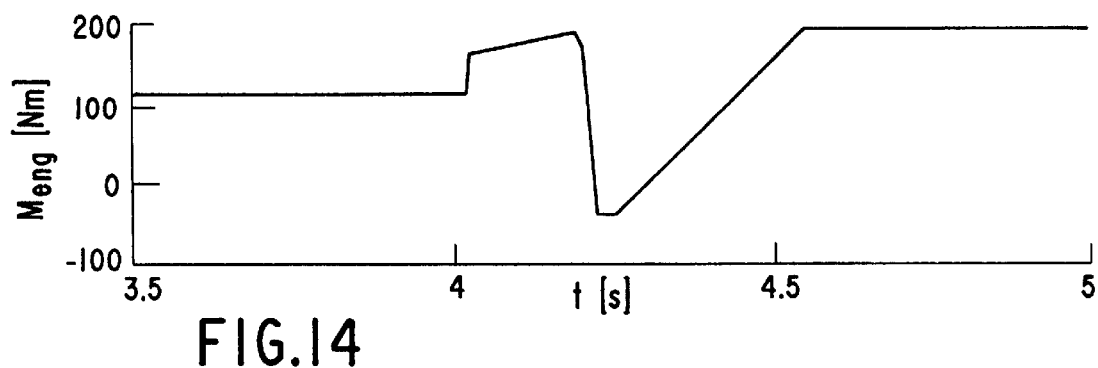

FIGS. 13 and 14 show the course over time of the output torque $M_{out}$ or the engine torque $M_{eng}$ in a traction downshifting operation in which a torque reduction according to the invention has been performed. The smoothing of the torque step at the output shaft, effected by the torque reduction, at the end of the shifting operation, wherein the end is definitive for gentle shifting, is clearly apparent (upper arrow in FIG. 13). Through the use of the invention, the smoothness of shifting of the vehicle drive 1 provided with an automatic transmission 2 is thus markedly improved, and the lost work occurring during shifting is reduced.

We claim:

1. In a control device for an automatic motor vehicle transmission, for reducing engine torque to increase smoothness of shifting during a shifting operation, the improvement comprising:

means for beginning the engine torque reduction not before attainment of a free-wheel point of the transmission and for ending the engine torque reduction shortly before a synchronizing point of the transmission is reached; and means for ascertaining the free-wheel point and the synchronizing point of the transmission on the basis of rpm differences between gearshift elements involved in a given shifting operation.

2. The control device according to claim 1, wherein the shifting operation occurs in a traction mode.

3. The control device according to claim 1, including means for ascertaining the rpm differences of transmission gearshift elements, each including two gearshift element halves, from a transmission input rpm, an output rpm and rpm factors resulting from gear tooth ratios in the transmission.

4. The control device according to claim 1, including means for reducing the engine torque as soon as the rpm difference of a given engaging gearshift element is not equal to zero.

5. The control device according to claim 4, including means for returning the engine torque to its outset value as soon as the rpm difference of the given gearshift element to be shifted exceeds a predetermined threshold rpm.

6. The control device according to claim 5, including a fuzzy system defining the threshold rpm, said fuzzy system evaluating a predetermined intensity of the engine torque reduction, a standardized engine torque at the beginning of shifting, and a standardized differential rpm at the engaging gearshift element, as input variables.

* * * * *

UNITED STATES PATENT AND TRADEMARK OFFICE
CERTIFICATE OF CORRECTION

PATENT NO : 5,822,708
DATED : October 13, 1998
INVENTOR(S): Thomas Wagner et al.

It is certified that error appears in the above-identified patent and that said Letters Patent is hereby corrected as shown below:

On title page,
Item [22] should read as follows:

Filed: Nov. 27, 1996

Signed and Sealed this

Twenty-third Day of February, 1999

*Attest:*

Q. TODD DICKINSON

*Attesting Officer*  *Acting Commissioner of Patents and Trademarks*